(12) United States Patent
Omori et al.

(10) Patent No.: US 12,532,479 B2
(45) Date of Patent: Jan. 20, 2026

(54) SEMICONDUCTOR DEVICE HAVING FERROELECTRIC MEMORY CELLS AND METHOD OF MANUFACTURING THE SAME (71) Applicant: RENESAS ELECTRONICS CORPORATION, Tokyo (JP)

(72) Inventors: Kazuyuki Omori, Tokyo (JP); Tadashi Yamaguchi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 395 days.

(21) Appl. No.: 18/179,720

(22) Filed: Mar. 7, 2023

(65) Prior Publication Data
US 2023/0345734 A1 Oct. 26, 2023

(30) Foreign Application Priority Data

Apr. 25, 2022 (JP) .................................. 2022-071615

(51) Int. Cl.
H10B 51/30 (2023.01)
(52) U.S. Cl.
CPC ..................................... H10B 51/30 (2023.02)
(58) Field of Classification Search
CPC ............................. H01L 29/401; H01L 21/28
See application file for complete search history.

(56) References Cited

U.S. PATENT DOCUMENTS

| 10,998,408 | B2 | 5/2021 | Yamaguchi | |
| 2003/0141788 | A1* | 7/2003 | Yamada | H03H 3/02 257/414 |
| 2019/0207009 | A1* | 7/2019 | Yamaguchi | H10D 30/701 |
| 2019/0355584 | A1* | 11/2019 | Yamaguchi | G11C 11/2273 |
| 2021/0028180 | A1* | 1/2021 | Yamaguchi | H10D 64/037 |
| 2021/0366932 | A1* | 11/2021 | Lee | H10B 51/10 |
| 2022/0285396 | A1* | 9/2022 | Huang | H10D 64/693 |

FOREIGN PATENT DOCUMENTS

JP 2019-201172 A 11/2019

OTHER PUBLICATIONS

Office Action dated Jul. 1, 2025, issued in corresponding Japan Patent Application No. 2022-071615, 10 pages.

* cited by examiner

Primary Examiner — Brian Turner
(74) Attorney, Agent, or Firm — Rimon P.C.

(57) ABSTRACT

A ferroelectric memory cell includes a paraelectric film formed on a semiconductor substrate and a ferroelectric layer formed on the paraelectric film. The ferroelectric layer includes ferroelectric films and a plurality of grains. The ferroelectric films are made of a material containing a metal oxide and a first element. The plurality of grains are made of a material different from the material forming the ferroelectric films, and are made of a ferroelectric.

15 Claims, 10 Drawing Sheets

|  | Vg | Vd | Vs | Vb |
|---|---|---|---|---|
| WRITE OPERATION | −4 | 0 | 0 | 0 |
| ERASE OPERATION | 4 | 0 | 0 | 0 |
| READ OPERATION | 0 | Vdd | 0 | 0 |

SEMICONDUCTOR DEVICE HAVING FERROELECTRIC MEMORY CELLS AND METHOD OF MANUFACTURING THE SAME

CROSS-REFERENCE TO RELATED APPLICATIONS

The present application claims priority from Japanese Patent Application No. 2022-071615 filed on Apr. 25, 2022, the content of which is hereby incorporated by reference to this application.

BACKGROUND

The present invention relates to a semiconductor device and a method of manufacturing the same, more particularly, a semiconductor device having ferroelectric memory cells and a method of manufacturing the same.

BACKGROUND

In recent years, a ferroelectric memory cell using a ferroelectric film has been developed as a semiconductor memory element that operates at a low voltage. A ferroelectric memory cell is a non-volatile memory cell that changes between a written state and an erased state by controlling a direction of a ferroelectric polarization. In the ferroelectric memory cell, there is a possibility that variations in threshold voltage with respect to a gate voltage may increase due to fluctuations in a crystal grain size and a crystal orientation of the ferroelectric film.

There are disclosed techniques listed below.
[Patent Document 1] Japanese Unexamined Patent Application Publication No. 2019-201172

For example, Patent Document 1 discloses a technique of forming an orthorhombic crystal ferroelectric film by forming a first amorphous film on a semiconductor substrate, forming a plurality of grains such as Al on the first amorphous film, forming a second amorphous film so as to cover the plurality of grains, and then performing a heat treatment. With such a technique, the crystal grain size and crystal orientation of the ferroelectric film can made uniform (be aligned). Incidentally, the ferroelectric film is a metal oxide film and, for example, is an $HfO_2$ film containing an element such as zirconium.

SUMMARY

In the technique disclosed in Patent Document 1 described above, since a plurality of grains are paraelectric, there is a problem in which places where variations in magnitude of polarization occur throughout the ferroelectric film are present. Therefore, the variations of threshold voltage with respect to a gate voltage cannot be completely eliminated, and there is a possibility that a ferroelectric memory cell with a small memory window (amount of change in threshold voltage) will be formed.

Basically, the larger the memory window, the easier it is to determine whether the ferroelectric memory cell is in a written state or an erased state in a read operation of the ferroelectric memory cell. Therefore, stored information in the ferroelectric memory cell can be read out accurately.

A main purpose of the present application is to improve reliability of a semiconductor device by providing a ferroelectric memory cell with a large memory window as well as aligning a crystal grain size and a crystal orientation of the ferroelectric film. Other objects and novel features will become apparent from the description of the specification and the accompanying drawings.

An outline of a representative one of the embodiments disclosed in the present application will be briefly described as follows.

A semiconductor device according to one embodiment includes a paraelectric film formed on a semiconductor substrate, and a ferroelectric layer formed on the paraelectric film. Here, the ferroelectric layer includes a ferroelectric film and a plurality of grains provided inside the ferroelectric film, the ferroelectric film is made of a material containing a metal oxide and a first element, and the plurality of grains are made of a material different from the material that constitutes the ferroelectric film, and are made of a ferroelectric.

A method of manufacturing a semiconductor device according to one embodiment includes: (a) forming a paraelectric film on a semiconductor substrate; (b) forming an amorphous film, which is made of a material containing a metal oxide and a first element, on the paraelectric film; (c) providing a plurality of grains inside the amorphous film; (d) after the (b) and the (c), forming a metal film on the amorphous film; and (e) after the (d), crystallizing the amorphous film by performing a heat treatment, thereby forming an orthorhombic crystal ferroelectric film. Here, the plurality of grains are configured by a material different from the material that constitutes the ferroelectric film, and are made of a ferroelectric.

A method of manufacturing a semiconductor device according to one embodiment includes: (a) forming a paraelectric film on a semiconductor substrate; (b) forming an amorphous film, which is made of a material containing a metal oxide and a first element, on the paraelectric film; (c) providing a plurality of grains on a lower surface of the amorphous film or an upper surface of the amorphous film; (d) after the (b) and the (c), forming a metal film on the amorphous film; and (e) after the (d), crystallizing the amorphous film by performing a heat treatment, thereby forming an orthorhombic crystal ferroelectric film. Here, by the (e), the plurality of grains are diffused into the ferroelectric film, and the plurality of grains are configured by a material different from the material that constitutes the ferroelectric film, and are made of a ferroelectric.

According to one embodiment, the reliability of the semiconductor device can be improved.

DETAILED DESCRIPTION

Hereinafter, embodiments will be described at details based on the drawings. Incidentally, throughout all the drawings for describing the embodiments, members having the same functions are denoted by the same reference numerals, and a repetitive description thereof will be omitted. Further, in the following embodiments, unless required in particular, the same or similar parts of the description will be not repeated in principle.

First Embodiment

<Structure of Semiconductor Device>

Figure 1:
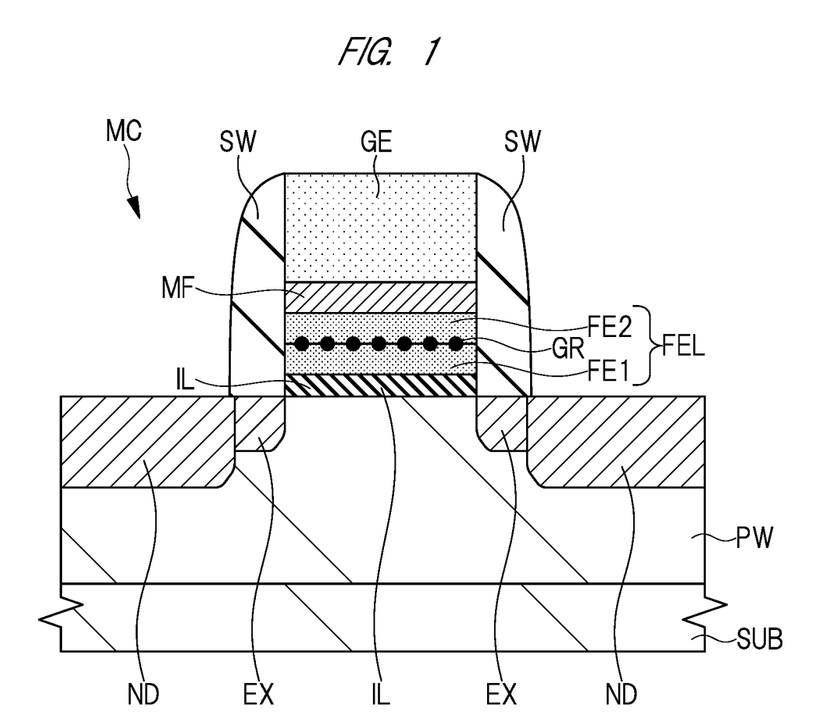
FIG. 1 is a sectional view showing a semiconductor device according to a first embodiment.

A semiconductor device according to a first embodiment will be described below with reference to FIGS. 1 to 3. A semiconductor device has ferroelectric memory cells MC as electrically rewritable non-volatile memory cells. FIG. 1 shows a ferroelectric memory cell MC called an MFIS (Metal Ferroelectric Insulator Semiconductor) structure in which a ferroelectric layer FEL is applied to a transistor.

As shown in FIG. 1, a semiconductor substrate SUB is made of, for example, p-type single crystal silicon (Si) and the like. A p-type well region PW is formed in the semiconductor substrate SUB.

A paraelectric film IL is formed on the semiconductor substrate SUB including the well region PW. The paraelectric film IL is, for example, a silicon oxide film or a silicon oxynitride film, and has a thickness of, for example, 1 nm or more and 3 nm or less. The paraelectric film IL is a film provided for the purpose of stabilizing an interface between the semiconductor substrate SUB and the ferroelectric layer FEL described later. Alternatively, the paraelectric film IL is a film for the purpose of preventing electrons from entering the ferroelectric layer FEL from the semiconductor substrate SUB when a voltage is applied to a gate electrode GE described later during an operation of the ferroelectric memory cell MC.

A ferroelectric layer FEL is formed on the paraelectric film IL. The ferroelectric layer FEL in the first embodiment includes a ferroelectric film FE1, a ferroelectric film FE2 and a plurality of grains GR. A detailed structure of the ferroelectric layer FEL will be described later.

A metal film MF is formed on the ferroelectric layer FEL. The metal film MF is a conductive film made of, for example, a titanium nitride film, a tantalum nitride film, or a tungsten film. A thickness of the metal film MF is, for example, 10 nm or more and 20 nm or less.

The metal film MF is a cap film provided to apply a stress to the ferroelectric film FE1 and the ferroelectric film FE2 during a manufacturing step of the ferroelectric layer FEL and to control an orientation of each crystal of the ferroelectric film FE1 and the ferroelectric film FE2. Therefore, after forming the ferroelectric layer FEL, if each of the ferroelectric film FE1 and the ferroelectric film FE2 can exist as a crystal of an orthorhombic crystal, the metal film MF may be removed. However, the removal of the metal film MF may cause variations in the orientation of each crystal of the ferroelectric film FE1 and the ferroelectric film FE2, so that it is more preferable to leave the metal film MF. Incidentally, when the metal film MF is left, the metal film MF also functions as a part of a gate electrode GE, which will be described later.

The gate electrode GE is formed on the metal film MF. The gate electrode GE is a conductive film made of, for example, a polycrystalline silicon film into which n-type impurities are introduced. Instead of the polycrystalline silicon film, the material forming the gate electrode GE may be a metal film such as a titanium nitride film, an aluminum film, or a tungsten film, or a laminated film obtained by appropriately laminating these.

Sidewall spacers SW are formed on side surfaces of the gate electrode GE. The sidewall spacer SW is made of, for example, a laminated film of a silicon oxide film and a silicon nitride film.

An extension region EX, which is a low-concentration n-type impurity region, is formed in the semiconductor substrate SUB under the sidewall spacer SW. A diffusion region ND, which is an n-type impurity region having a higher concentration than the extension region EX, is formed in the semiconductor substrate SUB exposed from the sidewall spacer SW. The extension region EX and the diffusion region ND are connected to each other, and form part of a source region and part of a drain region of the ferroelectric memory cell MC, respectively.

Incidentally, although not shown here, a silicide layer made of, for example, cobalt silicide, nickel silicide, nickel platinum silicide, or the like may be formed on the gate electrode GE and the diffusion region ND.

<Operation of Ferroelectric Memory Cell MC>

Figure 2:
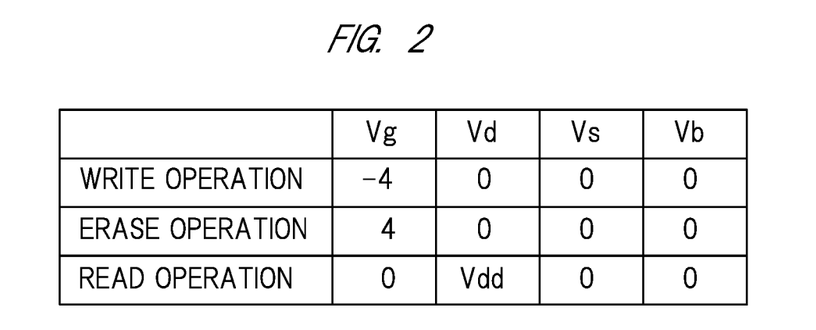
FIG. 2 is a table showing an applied voltage during each operation of a ferroelectric memory.

FIG. 2 shows an applied voltage during each operation of the ferroelectric memory cell MC. A gate voltage Vg is applied to the gate electrode GE, a source voltage Vs is applied to the diffusion region ND serving as the source region, a drain voltage Vd is applied to the diffusion region ND serving as the drain region, and a back gate voltage Vb is applied to the well region PW.

In a write operation, voltages shown in the "write operation" column of FIG. 2 are applied to the ferroelectric memory cells MC. Consequently, a negative remanent polarization remains in the ferroelectric layer FEL, a direction of polarization is directed upward, and a threshold voltage of the ferroelectric memory cell MC rises. As a result, the ferroelectric memory cell MC is a written state.

In an erase operation, voltages shown in the "erase operation" column of FIG. 2 are applied to the ferroelectric memory cells MC. Consequently, a positive remanent polarization remains in the ferroelectric layer FEL, a direction of polarization is directed downward, and a threshold voltage of the ferroelectric memory cell MC is lowered. As a result, the ferroelectric memory cell MC is an erased state.

The voltage applied to the gate electrode GE during a read operation is set to be lower than the threshold voltage of the ferroelectric memory cell MC in the written state and to be higher than the threshold voltage of the ferroelectric memory cell MC in an erased state. Also, the drain voltage Vd is a positive voltage Vdd of about 1 to 3 V, for example. Consequently, no current flows in the ferroelectric memory cell MC in the written state, or an amount of current, if any, is very small. Meanwhile, a large current flows through the ferroelectric memory cell MC in the erased state. Thus, the storage state of the ferroelectric memory cell MC can be determined based on magnitude of current values flowing through the ferroelectric memory cell MC.

<Detailed Structure of Ferroelectric Layer>

The ferroelectric layer FEL includes a ferroelectric film and a plurality of grains GR provided inside the ferroelectric film. In the first embodiment, the above-mentioned ferroelectric film is formed of a laminated film of the ferroelectric film FE1 and the ferroelectric film FE2, and the plurality of grains GR are formed inside the ferroelectric film FE1 and ferroelectric film FE2. That is, the plurality of grains GR are separated from each other and formed between the ferroelectric film FE1 and the ferroelectric film FE2.

Each of the ferroelectric film FE1 and the ferroelectric film FE2 is made of a metal oxide film, and is a high dielectric constant film having a higher dielectric constant than, for example, a silicon nitride film. Also, a thickness of each of the ferroelectric film FE1 and the ferroelectric film FE2 is, for example, 2 nm or more and 10 nm or less. In this case, the overall thickness of the ferroelectric layer FEL is, for example, 4 nm or more and 20 nm or less.

Further, each of the ferroelectric film FE1 and the ferroelectric film FE2 is an insulating film made of a material in which dielectric polarization is caused when an electric field is generated from outside and the polarization is not eliminated even when the electric field is removed, namely, an insulating film formed of a ferroelectric. That is, even when no electric field is applied, remanent polarization having certain magnitude exists in the ferroelectric film FE1 and the ferroelectric film FE2. The ferroelectric is a material in which electric dipoles are aligned without an external electric field and a direction of the dipoles can be changed by the electric field.

Then, each of the ferroelectric film FE1 and the ferroelectric film FE2 needs to be a crystal that is not centrosymmetric. In other words, a film formed by centrosymmetric crystals is a paraelectric film. Therefore, in the ferroelectric memory cell MC, a crystal forming the dielectric film FE1 and the ferroelectric film FE2 needs to be formed by a non-centrosymmetric crystal, for example, an orthorhombic crystal or hexagonal crystal in order to realize an increase in remanent polarization of the ferroelectric memory cell MC, improvement in performance as a ferroelectric, and a reduction in driving power of the ferroelectric memory cell MC.

In the first embodiment, each of the ferroelectric film FE1 and the ferroelectric film FE2 is made of a material containing a metal oxide and a first element. The metal oxide is, for example, hafnium oxide ($HfO_2$), gallium oxide ($Ga_2O_3$), or the like. The first element is, for example, zirconium (Zr). The first element may be silicon (Si), germanium (Ge), yttrium (Y), lanthanum (La), or ytterbium (Yb) instead of zirconium.

The plurality of grains GR function as crystal nuclei for making the ferroelectric film FE1 and the ferroelectric film FE2 into crystals of orthorhombic crystals during a manufacturing step of the ferroelectric layer FEL. Therefore, the plurality of grains GR are made of a plurality of grains that are separated from each other. Incidentally, as long as the plurality of grains GR function as crystal nuclei for crystallizing the ferroelectric film, some of the plurality of grains GR may be in contact with each other.

In other words, the plurality of grains GR are not films formed continuously like the ferroelectric film FE1 and the ferroelectric film FE2 but are formed discontinuously. If each of the plurality of grains GR is bound together to form a film, a function as a crystal nucleus thereof leads to being degraded. Also, a surface density of the plurality of grains GR is in a range of $1\times10^{13}/cm^2$ or more and $1\times10^{14}/cm^2$ or less, and most preferably $5\times10^{13}/cm^2$.

The plurality of grains GR are, for example, aluminum nitride (A1N). Also, the plurality of grains GR may be gallium oxide (GaO) or lanthanum oxide (LaO) instead of aluminum nitride. In the first embodiment, each of the plurality of grains GR is formed of an aggregate of 2 to 4 atoms.

The plurality of grains GR in the first embodiment are ferroelectric and crystals of orthorhombic crystals like the ferroelectric film FE1 and the ferroelectric film FE2. Also, a material forming the plurality of grains GR is different from the material forming the ferroelectric film FE1 and the ferroelectric film FE2. A remanent polarization of the grains GR is larger in magnitude than the remanent polarization of the ferroelectric film FE1 and ferroelectric film FE2.

Figure 3:
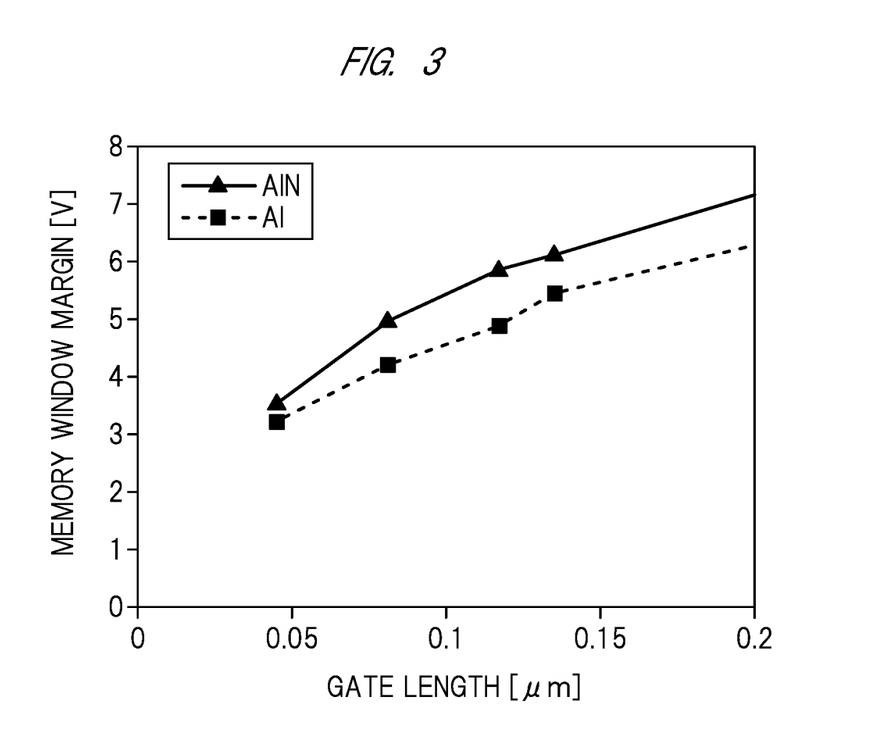
FIG. 3 is a graph showing a result of an experiment conducted by the inventors of the present application.

FIG. 3 is a graph showing a result of experiments conducted by the inventor(s) of the present application. A vertical axis in FIG. 3 is a memory window margin indicating an amount of change in threshold voltage. A horizontal axis of FIG. 3 is a gate length of the gate electrode GE. Also, "A1N" in FIG. 3 indicates a case where the plurality of grains GR are ferroelectric aluminum nitride as in the first embodiment. "A1" in FIG. 3 indicates a case where the plurality of grains GR are paraelectric aluminum as in Patent Document 1, for example.

As described above, when the plurality of grains GR are paraelectric, the magnitude of the remanent polarization tends to vary in the ferroelectric layer FEL as a whole, and it may be difficult to completely eliminate the variations in threshold voltage.

From the result in FIG. 3, it can be seen that "A1N" has a larger amount of change in threshold voltage than "A1" for each gate length. That is, in the first embodiment, it is presumed that the variations in the magnitude of the remanent polarization of the ferroelectric layer FEL is eliminated by applying the plurality of grains GR that are ferroelectric. Therefore, in the read operation of the ferroelectric memory cell MC, it is easy to determine whether the ferroelectric memory cell MC is in the written state or the erased state, so that stored information can be read out accurately. This makes it possible to improve the reliability of the semiconductor device.

Also, the magnitude of the remanent polarization of the plurality of grains GR is larger than the magnitude of the remanent polarization of the ferroelectric films FE1 and FE2. Consequently, the magnitude of the remanent polarization existing in the ferroelectric layer FEL can be further increased, so that the amount of change in the threshold voltage can be further increased.

Incidentally, as an example of the ferroelectric layer FEL of another ferroelectric memory cell, it is conceivable to stack another ferroelectric film made of the same material as the plurality of grains GR on the ferroelectric film FE1. However, in that case, crystallization of the ferroelectric film FE1 cannot be promoted, and there is a possibility that it is difficult to make the entire ferroelectric film FE1 into an orthorhombic crystal.

In the first embodiment, the plurality of grains GR exist inside the ferroelectric film FE1 and the ferroelectric film FE2, and function as a nucleus for forming the ferroelectric film FE1 and the ferroelectric film FE2 into crystals of orthorhombic crystal. Therefore, the entire ferroelectric film FE1 and ferroelectric film FE2 can be formed as crystals of orthorhombic crystal.

<Method of Manufacturing Semiconductor Device>

A method of manufacturing the semiconductor device according to the first embodiment will be described below with reference to FIGS. 4 to 9.

Figure 4:
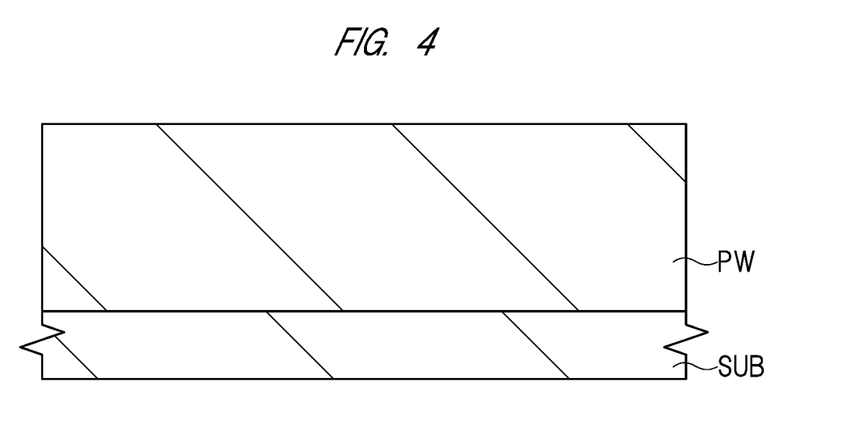
FIG. 4 is a sectional view showing a manufacturing step of the semiconductor device according to the first embodiment.

First, as shown in FIG. 4, a semiconductor substrate SUB made of, for example, single crystal silicon into which p-type impurities are introduced is prepared. Next, a p-type well region PW is formed in the semiconductor substrate SUB by a photolithography technique and an ion implantation method.

Figure 5:
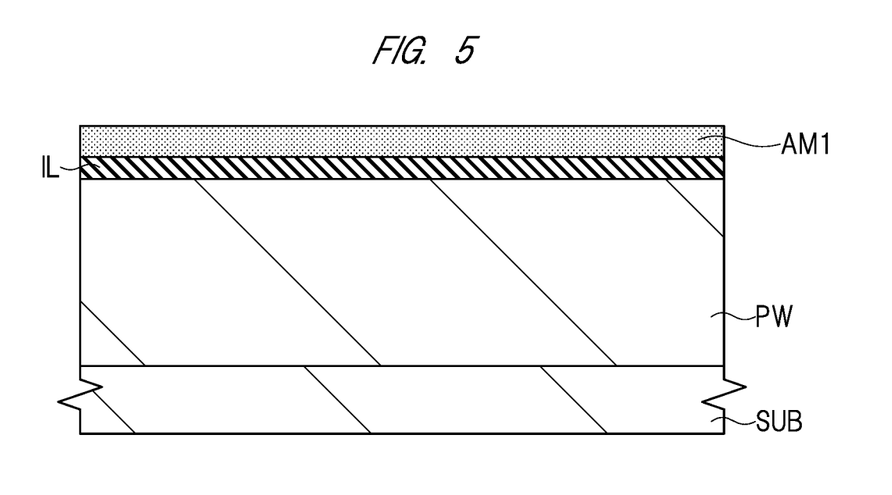
FIG. 5 is a sectional view showing a manufacturing step of the semiconductor device following FIG. 4.

Next, as shown in FIG. 5, a paraelectric film IL made of, for example, a silicon oxide film is formed on the semiconductor substrate SUB by, for example, a thermal oxidation method or a CVD (Chemical Vapor Deposition) method.

Next, an amorphous film AM1 is formed on the paraelectric film IL by, for example, an ALD (Atomic Layer Deposition) method. The amorphous film AM1 is made of, for example, a material containing a metal oxide and a first element. The metal oxide is, for example, hafnium oxide ($HfO_2$), gallium oxide ($Ga_2O_3$), or the like. The first element is, for example, zirconium (Zr). The first element may be any of silicon (Si), germanium (Ge), yttrium (Y), lanthanum (La) or ytterbium (Yb) instead of zirconium. A thickness of the amorphous film AM1 is, for example, 2 nm or more and 10 nm or less.

Figure 6:
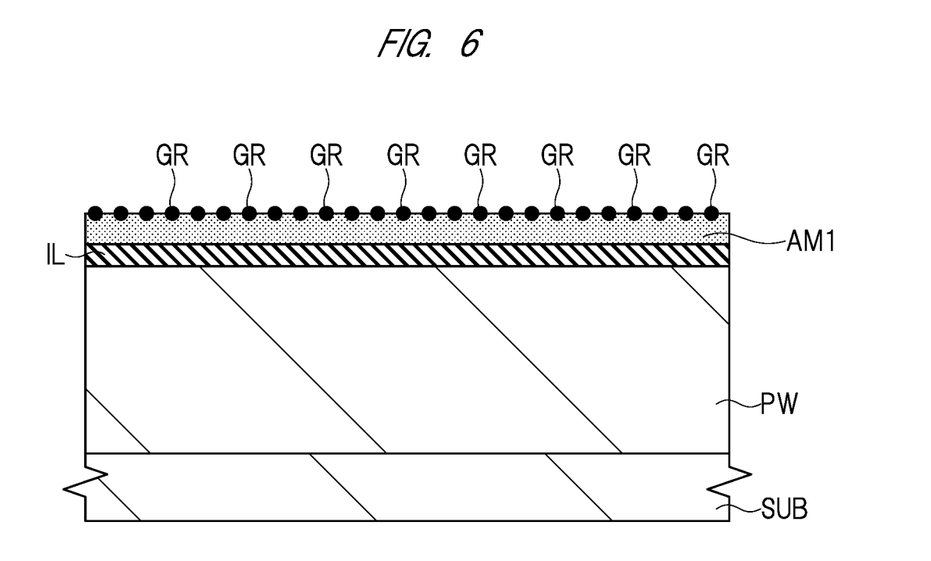
FIG. 6 is a sectional view showing a manufacturing step of the semiconductor device following FIG. 5.

Next, as shown in FIG. 6, a plurality of grains GR are formed on the amorphous film AM1 by a reactive sputtering method. The plurality of grains GR are, for example, aluminum nitride (AlN). Also, the plurality of grains GR may be gallium oxide (GaO) or lanthanum oxide (LaO) instead of aluminum nitride. Further, the plurality of grains GR are made of a material different from the material forming the amorphous film AM1, are ferroelectric, and are crystals of orthorhombic crystal.

When the plurality of grains GR are aluminum nitride, a target made of aluminum and a mixed gas of argon gas (Ar gas) and nitrogen gas ($N_2$ gas) are used in the reactive sputtering method. At this time, by adopting a poison mode in which a ratio of nitrogen gas in the mixed gas is 24% or more, ferroelectric aluminum nitride is formed as a plurality of grains GR. Also, a surface density of the plurality of grains GR is in a range of $1\times10^{13}/cm^2$ or more and $1\times10^{14}/cm^2$ or less, and most preferably $5\times10^{13}/cm^2$. Also, in order to prevent the plurality of grains GR from diffusing too much into the amorphous film AM1, the reactive sputtering method is preferably performed at temperature in a range of 1 to 150° C.

The plurality of grains GR are separated from each other. In other words, the plurality of grains GR are not a film continuously formed like the amorphous film AM1 but are discontinuously formed. That is, the plurality of grains GR do not cover the entire amorphous film AM1, but are scattered on the amorphous film AM1. Therefore, a portion of the amorphous film AM1 is covered with the plurality of grains GR, and the other portion of the amorphous film AM1 is exposed from the plurality of grains GR.

Some of the plurality of grains GR are deposited on an upper surface of the amorphous film AM1, but there are also the plurality of grains GR introduced near the upper surface of and inside the amorphous film AM1. Therefore, the plurality of grains GR can function as crystal nuclei in a step of crystallizing the amorphous film AM1 or the like, which will be described later.

Figure 7:
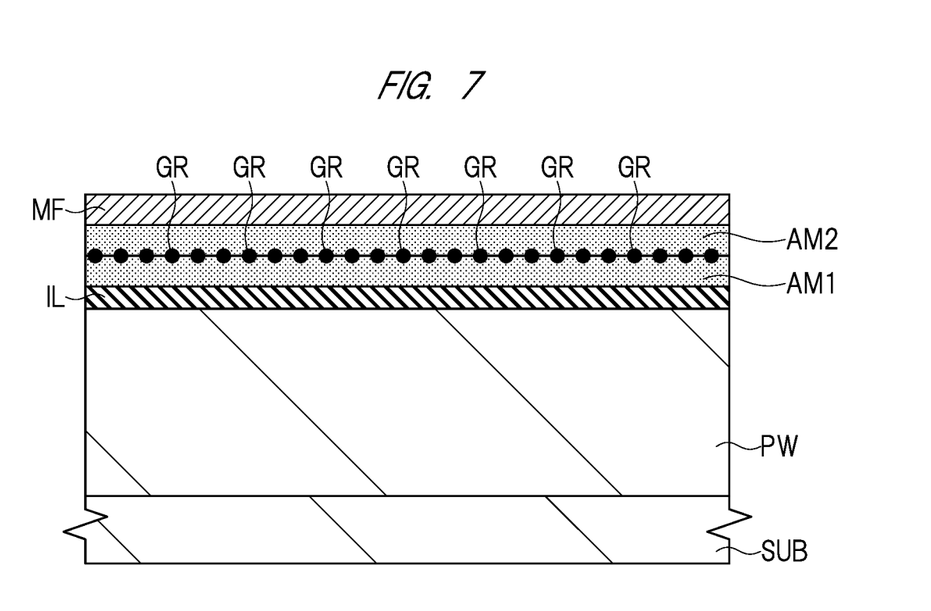
FIG. 7 is a sectional view showing a manufacturing step of the semiconductor device following FIG. 6.

Next, as shown in FIG. 7, an amorphous film AM2 is formed on the amorphous film AM1 by an ALD method, for example. In this step, the plurality of grains GR are covered with the amorphous film AM2. That is, the plurality of grains GR are provided inside the amorphous film AM1 and the amorphous film AM2. The amorphous film AM2 is made of the same material as that of the amorphous film AM1. A thickness of the amorphous film AM2 is, for example, 2 nm or more and 10 nm or less.

Next, a metal film MF made of, for example, titanium nitride, tantalum nitride, or tungsten is formed on the amorphous film AM2 by using, for example, a CVD method or a sputtering method. A thickness of the metal film MF is, for example, 10 nm or more and 20 nm or less. The metal film MF is provided mainly to apply stresses to the amorphous film AM1 and the amorphous film AM2.

Figure 8:
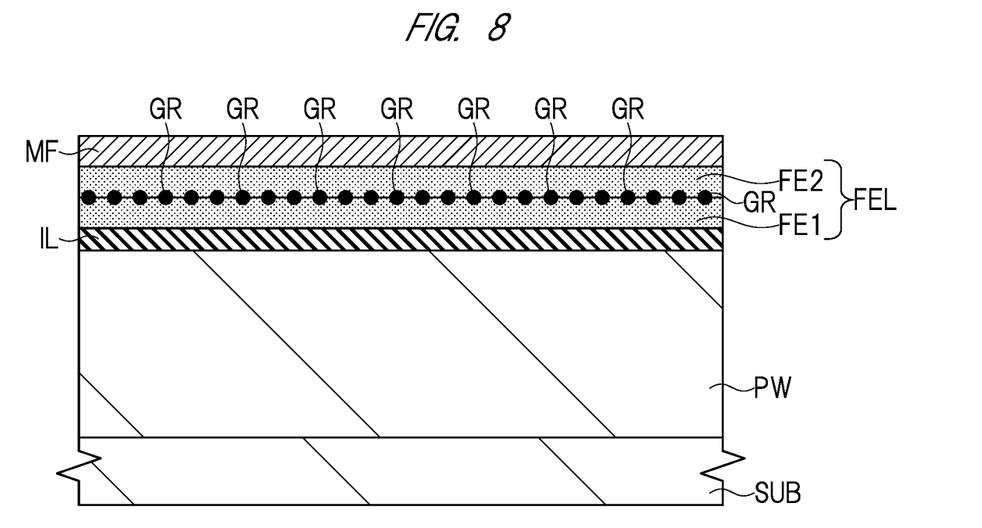
FIG. 8 is a sectional view showing a manufacturing step of the semiconductor device following FIG. 7.

Next, as shown in FIG. 8, heat treatment is performed to crystallize the amorphous film AM1 to form an orthorhombic crystal ferroelectric film FE1, and to crystallize the amorphous film AM2 to form an orthorhombic crystal ferroelectric film FE2. By this, a ferroelectric layer FEL including the ferroelectric film FE1, the ferroelectric film FE2, and the plurality of grains GR is formed.

Although this heat treatment can be performed at a temperature of 600° C. or less by an RTA (Rapid Thermal Annealing) method, it is preferable to use microwave having a frequency of 1 GHz or more and 10 GHz or less as electromagnetic waves. Moreover, it is more preferable to perform this heat treatment using microwave having a frequency of 2.45 GHz. The heat treatment using a microwave enables crystallization at low temperature, for example, at a temperature of 400° C. or less.

In this heat treatment using microwave, the microwave is irradiated so that an oscillation direction of an electric field (electric field) is at 90 degrees (perpendicular) to an upper surface of the metal film MF or the upper surface of the semiconductor substrate SUB. In electromagnetic waves such as microwaves, energy is absorbed by polarized crystals, so that the ferroelectric films FE1 and the ferroelectric film FE2, which are polarized crystals, are likely to be formed. Therefore, as described above, the heat treatment for crystallization can be easily performed at a low temperature of 400° C. or less.

Also, in this crystallization step, the orientation of each of the ferroelectric film FE1 and the ferroelectric film FE2 is controlled by the stress from the metal film MF. That is, when the amorphous film AM1 and the amorphous film AM2 are crystallized into the ferroelectric film FE1 and the ferroelectric film FE2, the metal film MF has a function of orienting a crystal phase of each of the ferroelectric film FE1 and the ferroelectric film FE2 to orthorhombic crystal.

Further, in the first embodiment, a plurality of grains GR are formed inside the amorphous film AM1 and the amorphous film AM2. This plurality of grains GR function as crystal nuclei in the crystallization step.

Figure 9:
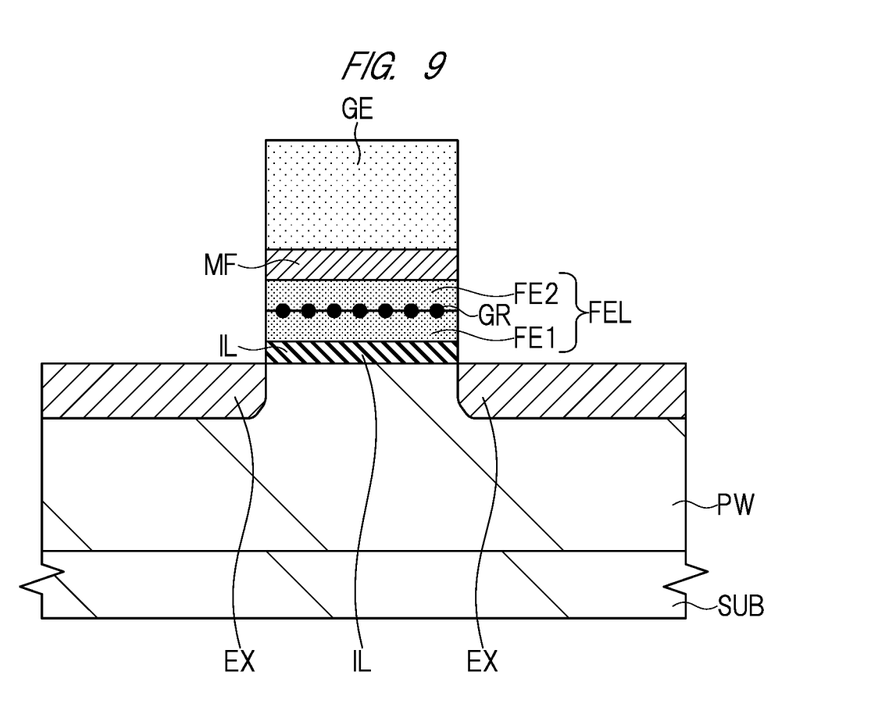
FIG. 9 is a sectional view showing a manufacturing step of the semiconductor device following FIG. 8.

Next, as shown in FIG. 9, a conductive film made of, for example, polycrystalline silicon into which n-type impurities are introduced is formed on the metal film MF by, for example, a CVD method. Next, the conductive film, metal film MF, ferroelectric film FE1, ferroelectric film FE2, and paraelectric film IL are selectively patterned by a photolithography technique and a dry etching method.

The conductive film left by this patterning functions as the gate electrode GE, and the metal film MF functions as part of the gate electrode GE. Incidentally, if the ferroelectric layer FEL can be sufficiently maintained as a crystal of orthorhombic crystal, the metal film MF may be removed before forming the conductive film.

Next, an extension region EX, which is an n-type impurity region, is formed in the semiconductor substrate SUB exposed from the gate electrode GE by a photolithography technique and an ion implantation method.

Thereafter, the semiconductor device having the ferroelectric memory cell MC shown in FIG. 1 is manufactured through the following steps.

First, a silicon oxide film and a silicon nitride film are, for example, sequentially formed by, for example, a CVD method so as to cover the gate electrode GE. Next, the silicon nitride film is processed by an anisotropic etching process. Then, the silicon oxide film formed on an upper surface and the like of the gate electrode GE is removed. Consequently, a sidewall spacer SW, which is made of a laminated film of the silicon oxide film and the silicon nitride film, is formed on the side surface of the gate electrode GE.

Next, a diffusion region ND, which is an n-type impurity region, is formed in the semiconductor substrate SUB exposed from the sidewall spacer SW by a photolithography method and an ion implantation method. A diffusion region ND has a higher impurity concentration than the extension region EX, and is connected to the extension region EX. The diffusion region ND and the extension region EX constitute part of the source region or part of the drain region of ferroelectric memory cell MC, respectively.

Thereafter, if necessary, a silicide layer such as cobalt silicide, nickel silicide or nickel platinum silicide may be formed on the upper surface of each of the diffusion region ND and the gate electrode GE by a salicide (Self Aligned Silicide) technique.

Second Embodiment

A semiconductor device and a method of manufacturing the same according to a second embodiment will be described below with reference to FIGS. 10 to 14. Incidentally, in the following description, differences from the first embodiment will be mainly described, and descriptions of points that overlap with the first embodiment will be omitted.

In the first embodiment, a two-layer structure of the ferroelectric film FE1 and the ferroelectric film FE2 is applied as the ferroelectric film of the ferroelectric layer FEL, and the plurality of grains GR are provided inside the ferroelectric film FE1 and the ferroelectric film FE2.

Figure 10:
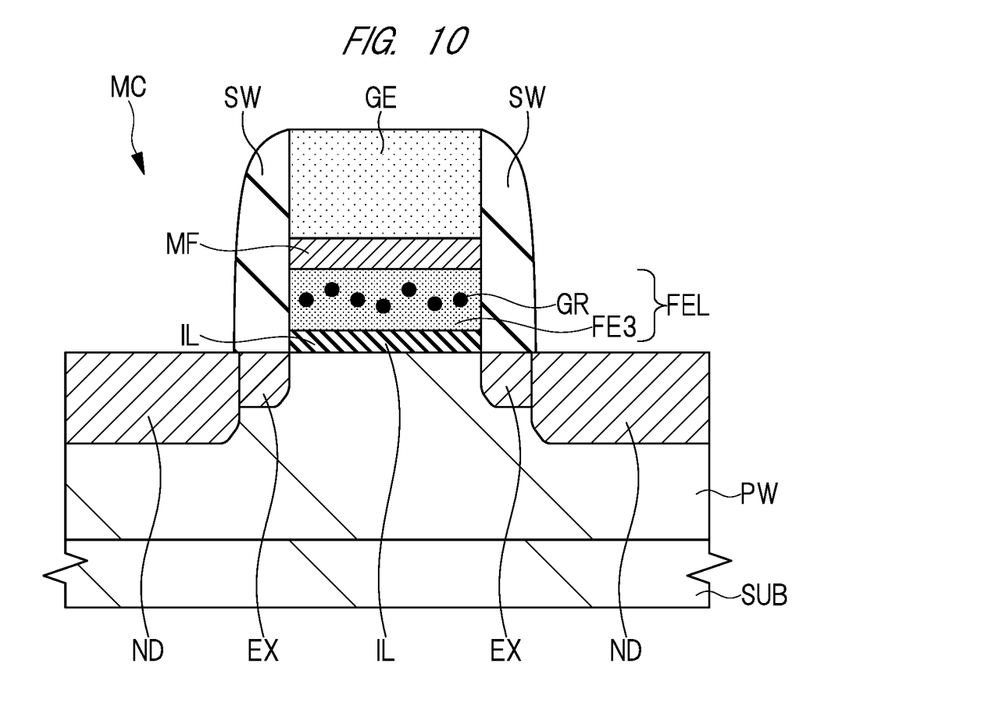
FIG. 10 is a sectional view showing a semiconductor device according to a second embodiment.

As shown in FIG. 10, in the second embodiment, a single-layer structure of the ferroelectric film FE3 is applied as the ferroelectric film of the ferroelectric layer FEL, and a plurality of grains GR are provided inside the ferroelectric film FE3. The ferroelectric film FE3 is made of the same material as those of the ferroelectric film FE1 and the ferroelectric film FE2 of the first embodiment. A thickness of the ferroelectric film FE3 is set to be a total value of the thickness of the ferroelectric film FE1 and the thickness of the ferroelectric film FE2, and is, for example, 4 nm or more and 20 nm or less.

Further, as in the first embodiment, the material forming the plurality of grains GR is different from the material forming the ferroelectric film FE3, and the magnitude of the remanent polarization of the plurality of grains GR is larger than the magnitude of the remnant polarization of the ferroelectric film FE3.

Also in the second embodiment, since the plurality of grains GR are ferroelectric, variations in the magnitude of remnant polarization of the ferroelectric layer FEL are eliminated, and the amount of change in threshold voltage is increased. Therefore, the reliability of the semiconductor device can be improved.

Figure 11:
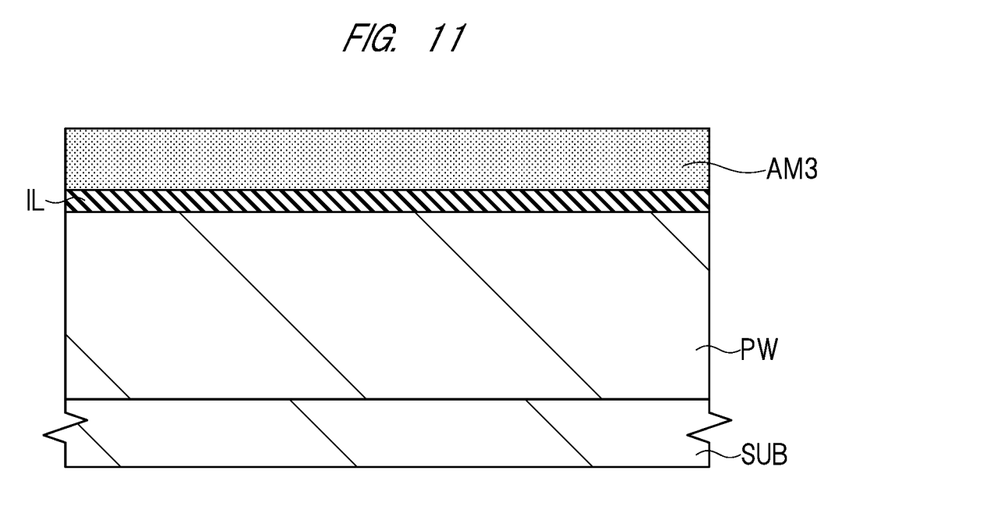
FIG. 11 is a sectional view showing a manufacturing step of the semiconductor device according to the second embodiment.

A method of manufacturing the semiconductor device according to the second embodiment will be described below with reference to FIGS. 11 to 14. FIG. 11 shows a manufacturing step after FIG. 4.

As shown in FIG. 11, a paraelectric film IL is formed on a semiconductor substrate SUB by a method similar to that of the first embodiment. Next, an amorphous film AM3 is formed on the paraelectric film IL by, for example, an ALD method. The amorphous film AM3 is made of the same material as those of the amorphous film AM1 and the amorphous film AM2 of the first embodiment. A thickness of the amorphous film AM3 is set to be a total value of the thickness of the amorphous film AM1 and the thickness of the amorphous film AM2, and is, for example, 4 nm or more and 20 nm or less.

Figure 12:
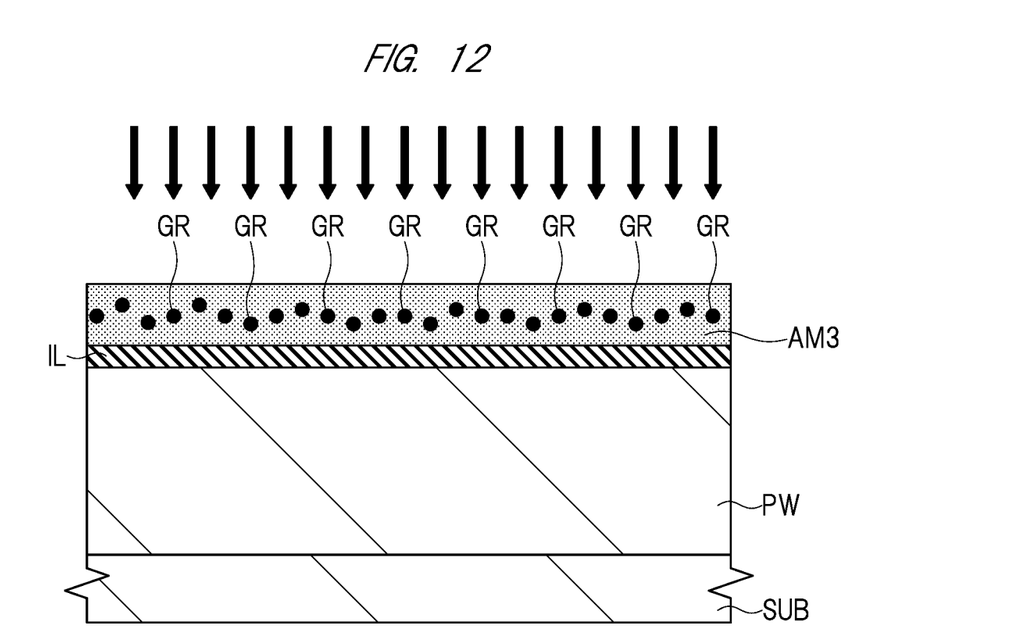
FIG. 12 is a sectional view showing a manufacturing step of the semiconductor device following FIG. 11.

Next, as shown in FIG. 12, a plurality of grains GR are introduced inside the amorphous film AM3 by an ion implantation method. Also in the second embodiment, a surface density of the plurality of grains GR is in a range of $1 \times 10^{13}/cm^2$ or more and $1 \times 10^{14}/cm^2$ or less, most preferably, $5 \times 10^{13}/cm^2$.

Figure 13:
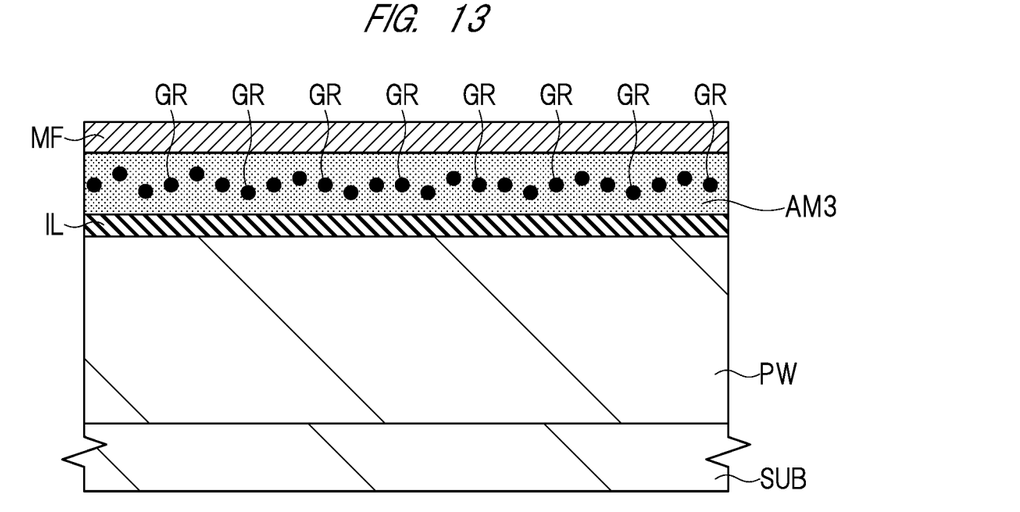
FIG. 13 is a sectional view showing a manufacturing step of the semiconductor device following FIG. 12.

Next, as shown in FIG. 13, a metal film MF is formed on the amorphous film AM3 by the same method as in the first embodiment.

Figure 14:
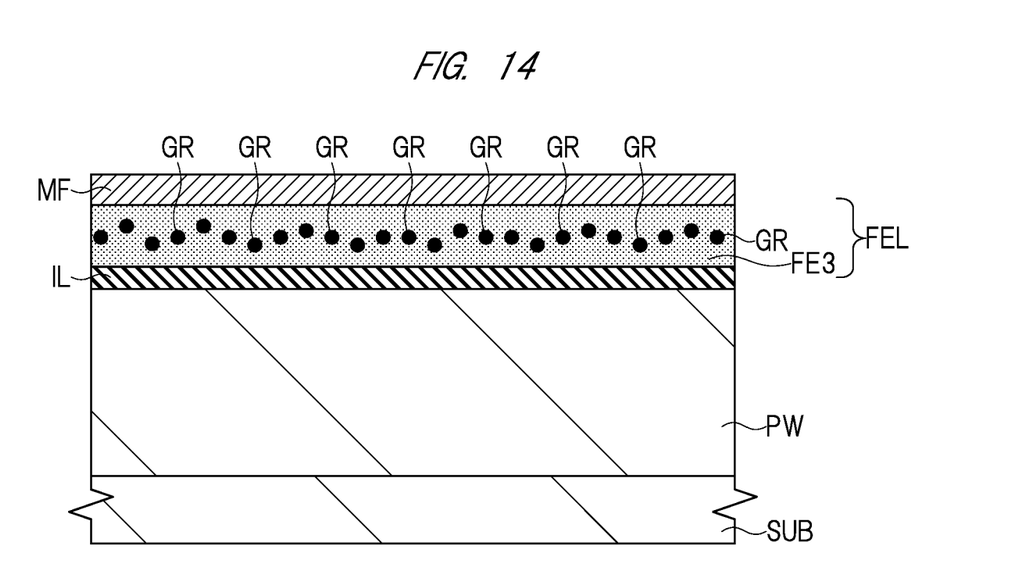
FIG. 14 is a sectional view showing the manufacturing step of the semiconductor device following FIG. 13.

Next, as shown in FIG. 14, the same heat treatment as in the first embodiment is performed to crystallize the amorphous film AM3 and to form an orthorhombic crystal ferroelectric film FE3. By this, the ferroelectric layer FEL including the ferroelectric film FE3 and the plurality of grains GR is formed. Also, as in the first embodiment, in this crystallization step, the orientation of the ferroelectric film FE3 is controlled by the stress from the metal film MF, and the plurality of grains GR function as crystal nuclei.

Thereafter, by forming the gate electrode GE, the extension region EX, the sidewall spacer SW, and the diffusion region ND through the same steps as the steps of FIG. 9 and subsequent Figures in the first embodiment, the semiconductor device including the ferroelectric memory cell MC shown in FIG. 10 is manufactured.

Third Embodiment

A method of manufacturing a semiconductor device according to a third embodiment will be described below with reference to FIGS. 15 and 16. Incidentally, in the following description, differences from the second embodiment will be mainly described, and descriptions of points that overlap with the second embodiment will be omitted.

A structure of a ferroelectric memory cell MC in a third embodiment is substantially the same as that in the second embodiment shown in FIG. 10, and the ferroelectric layer FEL includes the ferroelectric film FE3 and the plurality of grains GR provided inside the ferroelectric film FE3.

Further, in the third embodiment, by providing the plurality of grains GR and by performing the thermal treatment for crystallizing the amorphous film AM3 into the ferroelectric film FE3, the plurality of grains GR are diffused into the ferroelectric film FE3. Here, a case of providing the plurality of grains GR on the upper surface of the amorphous film AM3 will be described.

Figure 15:
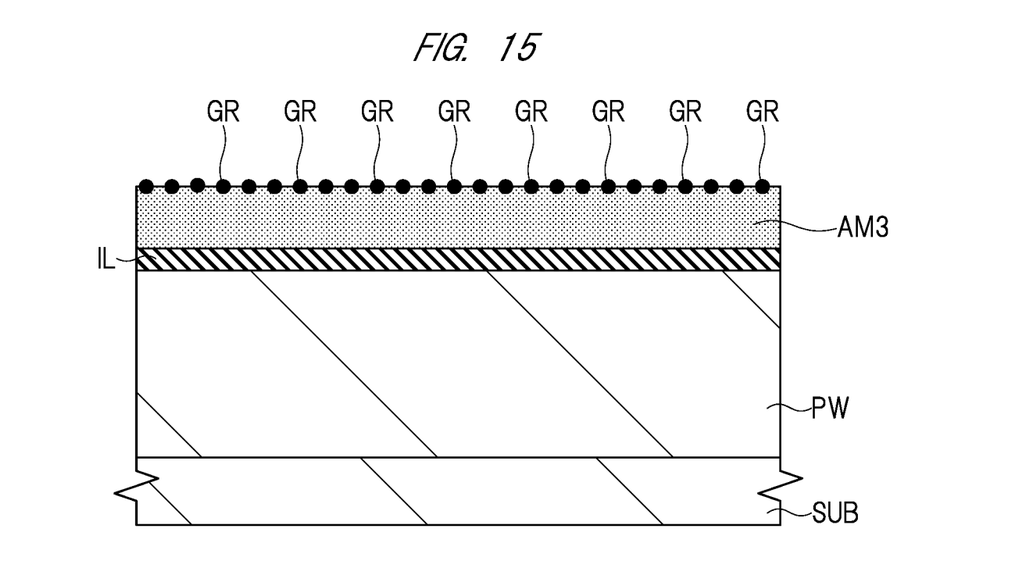
FIG. 15 is a sectional view showing a manufacturing step of a semiconductor device according to a third embodiment.

FIG. 15 shows a manufacturing step after FIG. 11. As shown in FIG. 15, a plurality of grains GR are formed on the amorphous film AM3 by a reactive sputtering method similar to that of the first embodiment.

Figure 16:
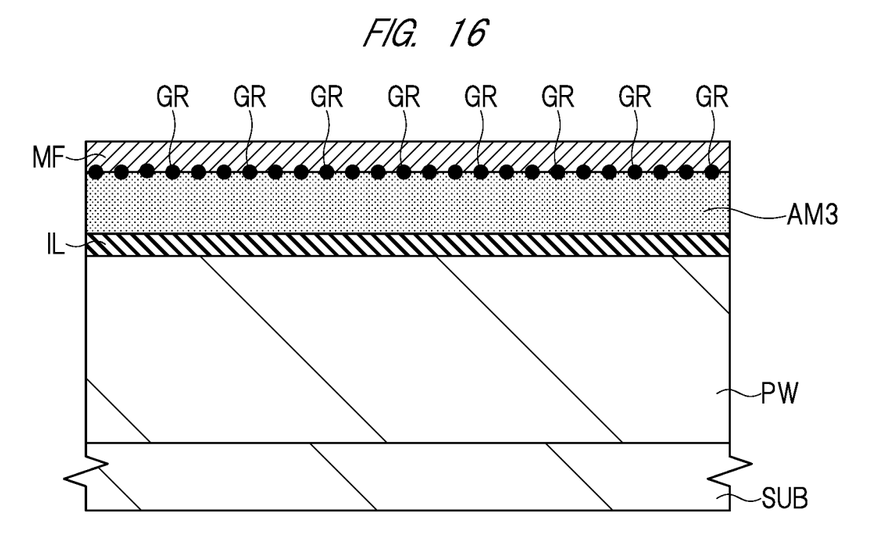
FIG. 16 is a sectional view showing a manufacturing step of the semiconductor device following FIG. 15.

Next, as shown in FIG. 16, a metal film MF is formed on the amorphous film AM3 by the same method as that in the first embodiment. The plurality of grains GR are covered with the metal film MF.

Next, the same heat treatment as in the first embodiment is performed to crystallize the amorphous film AM3 to form an orthorhombic crystal ferroelectric film FE3. Moreover, due to this heat treatment, the plurality of grains GR provided on the upper surface of the amorphous film AM3 are diffused into the ferroelectric film FE3. Incidentally, also in the third embodiment, the orientation of the ferroelectric film FE3 is controlled by the stress from the metal film MF, and the plurality of grains GR also function as crystal nuclei while diffusing.

As described above, a structure of FIG. 14 is obtained. Thereafter, through the same steps as those of FIG. 9 and subsequent Figures in the first embodiment, the semiconductor device having the ferroelectric memory cell MC shown in FIG. is manufactured.

Modification Example

A method of manufacturing a semiconductor device according to a modification example of the third embodiment will be described below with reference to FIGS. 17 to 19. In this modification example, a case in which the plurality of grains GR are provided on the lower surface of the amorphous film AM3 will be described.

Figure 17:
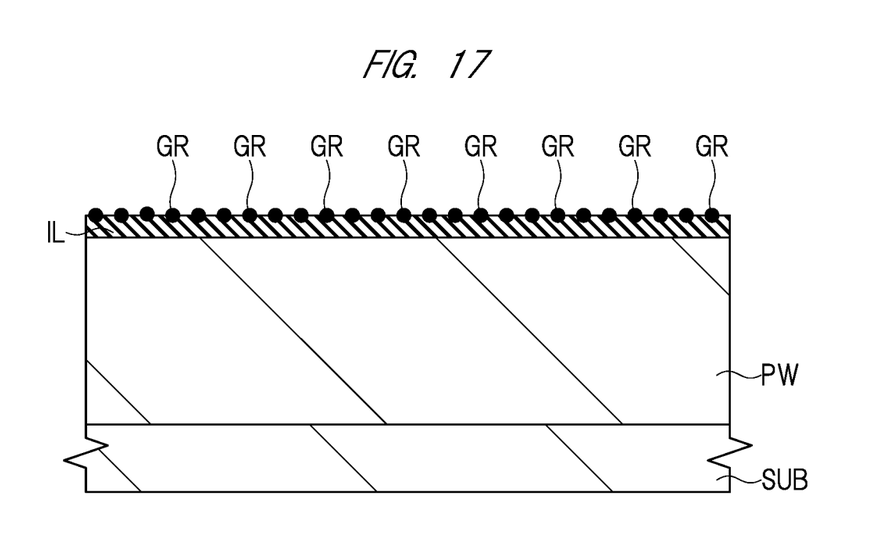
FIG. 17 is a sectional view showing a manufacturing step of a semiconductor device according to a modification example of the third embodiment.

FIG. 17 shows the manufacturing step after FIG. 4. As shown in FIG. 17, a paraelectric film IL is formed on a semiconductor substrate SUB by a method similar to that of the first embodiment. Next, a plurality of grains GR are formed on the paraelectric film IL by a reactive sputtering method similar to that of the first embodiment.

Figure 18:
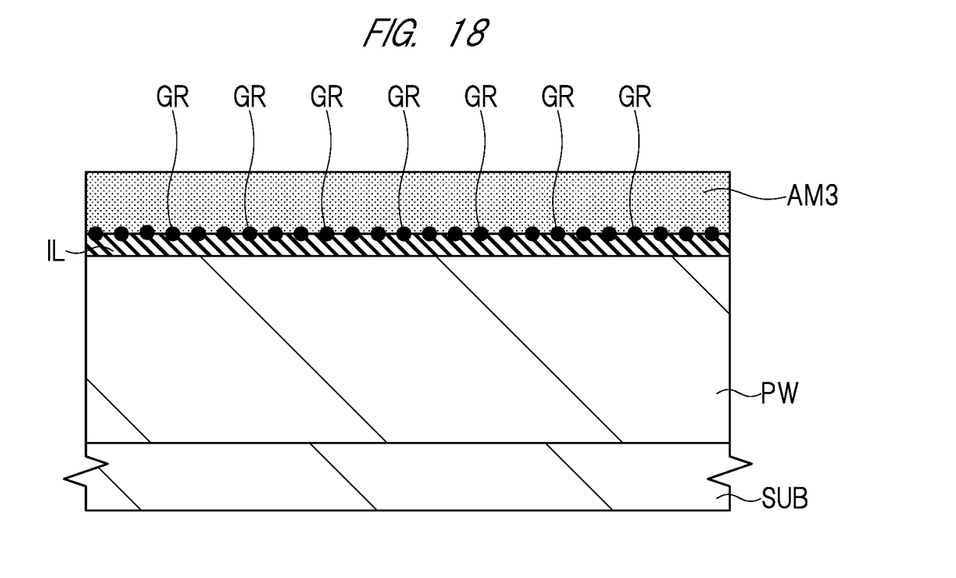
FIG. 18 is a sectional view showing a manufacturing step of the semiconductor device following FIG. 17.

Next, as shown in FIG. 18, an amorphous film AM3 is formed on the paraelectric film IL by, for example, an ALD method. The plurality of grains GR are covered with the amorphous film AM3.

Figure 19:
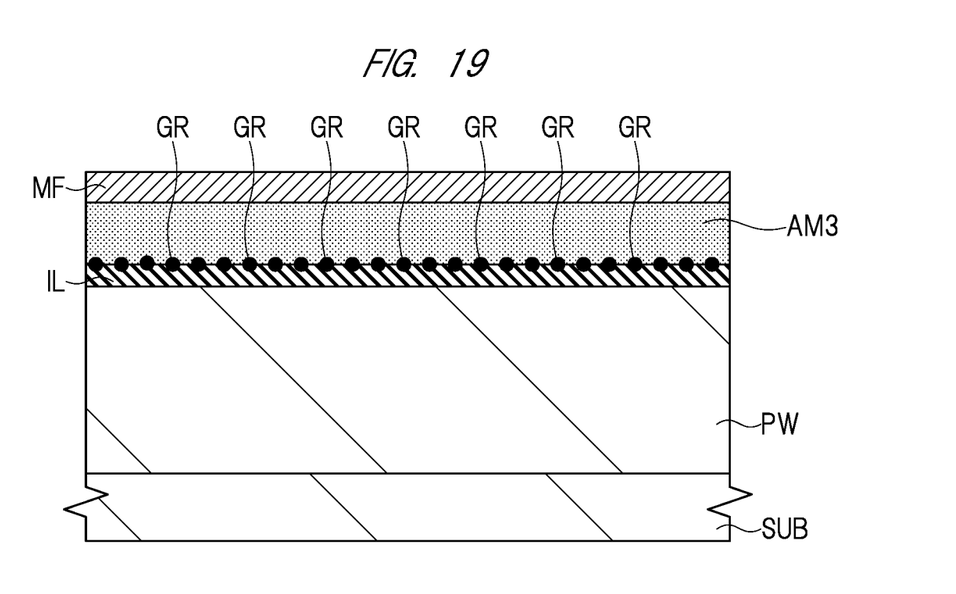
FIG. 19 is a sectional view showing a manufacturing step of the semiconductor device following FIG. 18.

Next, as shown in FIG. 19, a metal film MF is formed on the amorphous film AM3 by the same method as in the first embodiment. Next, the same heat treatment as in the first embodiment is performed to crystallize the amorphous film AM3 and to form an orthorhombic crystal ferroelectric film FE3. In addition, due to this heat treatment, the plurality of grains GR provided on the lower surface of the amorphous film AM3 are diffused into the ferroelectric film FE3. Incidentally, also in the modification example, the orientation of the ferroelectric film FE3 is controlled by the stress from the metal film MF, and the plurality of grains GR function as crystal nuclei while diffusing.

As described above, the structure of FIG. 14 is obtained. Thereafter, through the same steps as those of FIG. 9 and subsequent Figures in the first embodiment, the semiconductor device having the ferroelectric memory cell MC shown in FIG. is manufactured.

Although the present invention has been specifically described above based on the embodiments for carrying out the present invention, the present invention is not limited to the above-described embodiments and can be variously modified without departing from the scope of the present invention.

What is claimed is:

1. A semiconductor device comprising:
   a paraelectric film formed on a semiconductor substrate; and
   a ferroelectric layer formed on the paraelectric film,
   wherein the ferroelectric layer includes:
      a ferroelectric film; and
      a plurality of grains provided inside the ferroelectric film,
   wherein the ferroelectric film is made of a material containing a metal oxide and a first element,
   wherein the plurality of grains are made of a material different from the material that constitutes the ferroelectric film, and are made of a ferroelectric,
   wherein the metal oxide is hafnium oxide or gallium oxide,
   wherein the first element is any of zirconium, silicon, germanium, yttrium, lanthanum or ytterbium,
   wherein each of the plurality of grains is gallium oxide or lanthanum oxide, and
   wherein the ferroelectric film is a crystal that is not centrosymmetric.

2. The semiconductor device according to claim 1, wherein a remanent polarization of the plurality of grains is larger in magnitude than a remanent polarization of the ferroelectric film.

3. The semiconductor device according to claim 1, wherein a surface density of the plurality of grains is in a range of $1\times10^{13}/cm^2$ or more and $1\times10^{14}/cm^2$ or less.

4. The semiconductor device according to claim 1, wherein the ferroelectric film is configured by a laminated film of a first ferroelectric film and a second ferroelectric film, and
   wherein the plurality of grains are formed separately from each other between the first ferroelectric film and the second ferroelectric film.

5. The semiconductor device according to claim 1, comprising an electrically rewritable ferroelectric memory cell, wherein the ferroelectric memory cell has:
   the paraelectric film;
   the ferroelectric layer;
   a gate electrode formed on the ferroelectric layer; and
   a source region and a drain region formed in the semiconductor substrate.

6. A method of manufacturing a semiconductor device, the method comprising:
   (a) forming a paraelectric film on a semiconductor substrate;
   (b) forming an amorphous film, which is made of a material containing a metal oxide and a first element, on the paraelectric film;
   (c) providing a plurality of grains inside the amorphous film;
   (d) after the (b) and the (c), forming a metal film on the amorphous film; and
   (e) after the (d), crystallizing the amorphous film by performing a heat treatment, thereby forming an orthorhombic crystal ferroelectric film,
   wherein the plurality of grains are configured by a material different from the material that constitutes the ferroelectric film, and are made of a ferroelectric,
   wherein the first element is any of zirconium, silicon, germanium, yttrium, lanthanum or ytterbium, wherein each of the plurality of grains is gallium oxide or lanthanum oxide, and wherein the ferroelectric film is a crystal that is not centrosymmetric.

7. The method according to claim 6, wherein the (b) includes:

(b1) forming a first amorphous film, which is made of a material containing a metal oxide and a first element, on the paraelectric film; and (b2) forming a second amorphous film, which is made of a material containing a metal oxide and the first element, on the first amorphous film, wherein in the (e), the first amorphous film is crystallized and is formed as an orthorhombic crystal first ferroelectric film, and the second amorphous film is crystallized and is formed as an orthorhombic crystal second ferroelectric film, wherein the (c) is performed between the (b1) and the (b2), wherein in the (c), the plurality of grains are formed on the first amorphous film by a reactive sputtering method in which a target made of aluminum and a mixed gas of argon gas and nitrogen gas are used, and wherein a ratio of nitrogen gas in the mixed gas is 24% or more.

8. The method according to claim 6, wherein after the (b), the (c) is performed by introducing the plurality of grains into the amorphous film by an ion implantation method.

9. The method according to claim 6, wherein a remanent polarization of the plurality of grains is larger in magnitude than a remanent polarization of the ferroelectric film.

10. The method according to claim 6, wherein a surface density of the plurality of grains is in a range of $1 \times 10^{13}/cm^2$ or more and $1 \times 10^{14}/cm^2$ or less.

11. A method of manufacturing a semiconductor device, the method comprising:

(a) forming a paraelectric film on a semiconductor substrate;

(b) forming an amorphous film, which is made of a material containing a metal oxide and a first element, on the paraelectric film;

(c) providing a plurality of grains on a lower surface of the amorphous film or an upper surface of the amorphous film;

(d) after the (b) and the (c), forming a metal film on the amorphous film; and (e) after the (d), crystallizing the amorphous film by performing a heat treatment, thereby forming an orthorhombic crystal ferroelectric film, wherein by the (e), the plurality of grains are diffused into the ferroelectric film, wherein the plurality of grains are configured by a material different from the material that constitutes the ferroelectric film, and are made of a ferroelectric, wherein the first element is any of zirconium, silicon, germanium, yttrium, lanthanum or ytterbium, wherein each of the plurality of grains is gallium oxide or lanthanum oxide, and wherein the ferroelectric film is a crystal that is not centrosymmetric.

12. The method according to claim 11, wherein the (c) is performed between the (b) and the (d), wherein in the (c), the plurality of grains are formed on the amorphous film by a reactive sputtering method in which a target made of aluminum and a mixed gas of argon gas and nitrogen gas are used, and wherein a ratio of nitrogen gas in the mixed gas is 24% or more.

13. The method according to claim 11, wherein the (c) is performed between the (a) and the (b), wherein in the (c), the plurality of grains are formed on the paraelectric film by a reactive sputtering method in which a target made of aluminum and a mixed gas of argon gas and nitrogen gas are used, and wherein a ratio of nitrogen gas in the mixed gas is 24% or more.

14. The method according to claim 11, wherein a remanent polarization of the plurality of grains is larger in magnitude than a remanent polarization of the ferroelectric film.

15. The method according to claim 11, wherein a surface density of the plurality of grains is in a range of $1 \times 10^{13}/cm^2$ or more and $1 \times 10^{14}/cm^2$ or less.

* * * * *